United States Patent [19]

Wislocki

[11] Patent Number: 4,933,670
[45] Date of Patent: Jun. 12, 1990

[54] MULTI-AXIS TRACKBALL

[75] Inventor: Nicholas C. Wislocki, North Royalton, Ohio

[73] Assignee: Picker International, Inc., Highland Hts., Ohio

[21] Appl. No.: 222,417

[22] Filed: Jul. 21, 1988

[51] Int. Cl.$^5$ .............................................. G09G 3/02
[52] U.S. Cl. ................................... 340/709; 340/706; 340/710; 273/148 B
[58] Field of Search ...................... 340/706, 709, 710; 273/148 B; 74/471 XY; 178/18; 364/518

[56] References Cited

U.S. PATENT DOCUMENTS

| | | | |
|---|---|---|---|
| 4,562,347 | 12/1985 | Hovey et al. | 340/710 |
| 4,801,931 | 1/1989 | Schmidt | 340/710 |
| 4,963,116 | 8/1988 | Eichholz | 340/710 |
| 4,987,051 | 11/1988 | Olson | 340/710 |

FOREIGN PATENT DOCUMENTS 0207921 10/1985 Japan .................................. 340/710

OTHER PUBLICATIONS

Fast Trap, "The Three Axis Pointing Device of the Future is here Now", advertising literature from Microspeed, Inc., 1987.
Fast Trap, External Reference Specification-Preliminary Release, advertising literature from Microspeed, Inc., 1987.

Primary Examiner—David K. Moore
Assistant Examiner—M. Fatahiyar
Attorney, Agent, or Firm—Fay, Sharpe, Beall, Fagan, Minnich & McKee

[57] ABSTRACT

A first electromechanical transducer (40) generates a first electrical signal indicative of rotation of a ball (A) relative to a first axis. A second electromechanical transducer (50) generates a second electrical signal indicative of rotation of the ball relative to a second axis. A third electromechanical transducer (60) generates a third electrical signal indicative of rotation of an annular ring (12) around the periphery of the ball, i.e. a third axis. A resolver circuit (D) converts the first, second, and third electrical signals into an indication of movement or position along the first, second, and third axes.

12 Claims, 2 Drawing Sheets

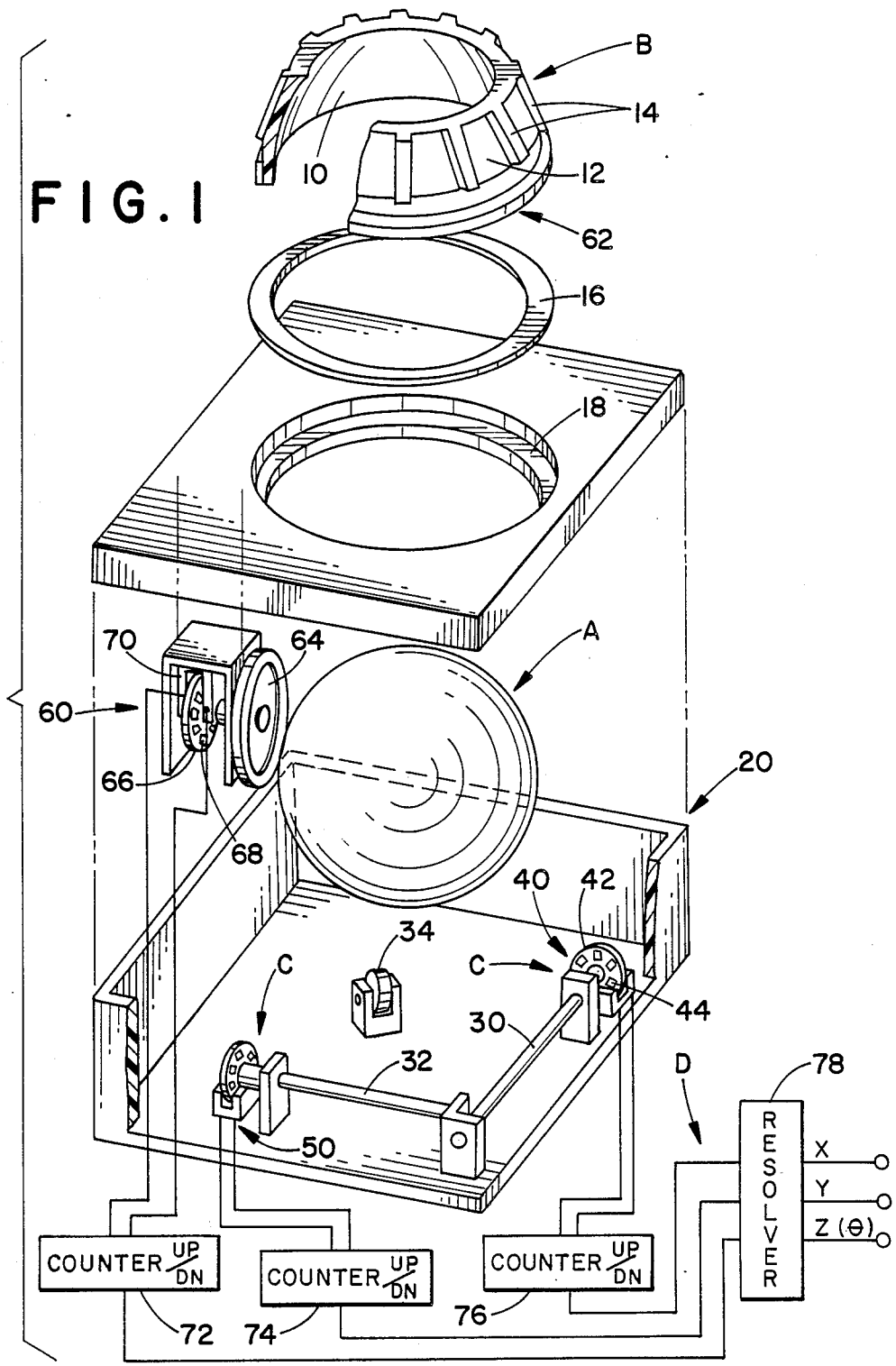

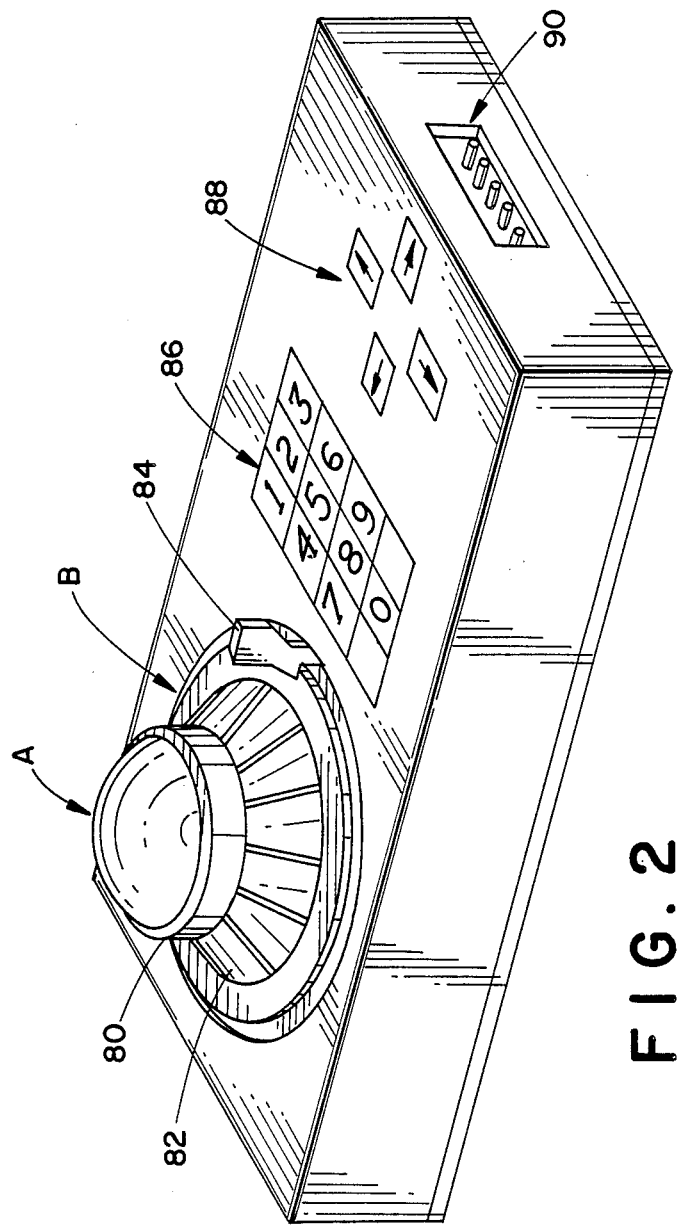

MULTI-AXIS TRACKBALL

BACKGROUND OF THE INVENTION

The present invention relates to the art of multi-axis direction and motion encoding. It finds particular application in conjunction with operator manipulation of portions of video displays relative to three axes and will be described with particular reference thereto. For example, the encoder may be used to shift a cursor or portions of a video display along the tube, vertically, longitudinally, or rotationally, i.e. a three axis manipulation. Such manipulations may be performed to move, align, or otherwise position medical diagnostic images. The invention is also applicable to cursor manipulation for home computer terminals, video games, CAD/CAM systems, and the like.

Heretofore, two and three dimensional trackballs have been readily available. Typically, a two dimensional track ball was supported on two perpendicular rollers. Frictional engagement between the ball and the rollers caused rotation of the ball to be translated into corresponding rotation of each roller. More specifically, the rotation of each roller was indicative of rotation of the ball relative to an axis parallel to the central axis of the roller. Encoders were connected with each roller to convert the rotation of the corresponding roller into electrical signals, e.g. an electrical pulse signal for each increment of a rotation.

For a three axis trackball, a third roller was positioned in frictional engagement with the ball. Normally, the three rollers were positioned with their central axes parallel to orthogonal coordinates. More specifically, one roller was normally positioned to measure left and right rotational movement of the ball, another roller for forward and aft rotation of the ball, and the third axis was positioned to measure rotation of the ball about a vertical axis. To rotate the ball and encode about the first two axes, one can normally palm the ball and merely push in the desired direction. To encode movement about the vertical axis, one must normally grab the ball with the fingers and twist.

One of the problems with the prior art three axis balls, particularly smaller diameter balls, resided in the difficulty to encode movement around the third or vertical axis. Most operators lacked sufficient fine motor skills and coordination to rotate the ball about the vertical axis without also causing translating motion about one or both of the horizontal axes. By way of example, most operators could not rotate a displayed cursor without also shifting its origin.

The present invention contemplates a new and improved track ball type arrangement which enables precise orientation or rotation relative to a third axis without altering the first and second axis.

SUMMARY OF THE INVENTION

In accordance with one aspect of the present invention, a multi-axis indicator is provided. A ball is rotatably mounted. A peripheral member is mounted adjacent the periphery of the ball for rotational movement therearound. A motion sensing means senses rotation of the ball and the peripheral member relative to at least three axis.

In accordance with a more limited aspect of the present invention, a track ball assembly provides positional information relative to at least three axis. A peripheral member, such as a ring, is mounted for rotation around a rotatably mounted ball. First and second motion sensing means sense rotation of the ball relative to first and second axes respectively. A third motion sensing means senses rotation of the peripheral member relative to the ball. Preferably, a resolver means converts the rotation sensed by the first, second, and third motion sensing means into the indication of movement relative to the three axes.

A primary advantage of the present invention resides in precise encoding of movement or angular displacement relative to a z or perpendicular to the plane axis.

Another advantage of the present invention is that it decouples adjustment relative to the z axis from the ball yet provides the tactile sensation analogous to rotation of a conventional three axis track ball.

Yet another advantage of the present invention is that it enables information to be encoded relative to more than three axes or variables.

Still further advantages of the present invention will become apparent to those of ordinary skill in the art upon reading and understanding the following detailed description of the preferred embodiments.

BRIEF DESCRIPTION OF THE DRAWINGS

The invention may take form in various parts and arrangements of parts or in various steps and arrangements of steps. The drawings are only for purposes of illustrating a preferred embodiment and are not to be construed as limiting the invention.

FIG. 1 is an exploded view in partial section of a track ball apparatus in accordance with the present invention; and, FIG. 2 is a perspective view of an alternate embodiment of the present invention.

DETAILED DESCRIPTION OF THE PREFERRED EMBODIMENTS

The speed ball arrangement includes a ball member A mounted for free rotation relative to all axes. A ring or peripheral member B is mounted to be rotated about the ball member. Preferably, the ring is mounted closely adjacent the ball member such that grasping and rotating the ring is an analogous fine motor movement to grasping and rotating the ball member. Sensing means C sense relative rotation of the ball and ring members about a plurality of axes. A resolver means D converts an output of the sensing means into an indication of x, y, and z or (theta) $\theta$ displacement.

The ball member A is a solid or hollow spherical member of plastic, or the like. For a three axis ball arrangement, the ball member is preferably rotatable in two axes. Accordingly, rather than being a true sphere, the ball member may include grooves, projections, or other structures which limit its movement to rotation along only the two axes in question.

The ring member B has an interior surface 10 shaped to accommodate the curvature of the ball member A. Optionally, a lubricant surface or coating may be provided along the inner ring surface to provide improved isolation of movement between the ball and ring members. The ring member further has an upper surface 12 having a plurality of ridges or other gripping improving means 14. In the illustrated embodiment, the upper ring surface is disposed at an angle, preferably, generally tangential to the surface of the ball at the point which the ball projects through the ring. A bearing 16 supports the ring member in a track 18 in the upper surface of a housing 20. Although the ring member is shown as a complete annulus, it is to be appreciated that it need not fully encircle the ball. Rather, a C-shaped ring member might be provided or even a single handle or gripping portion which runs in a ring-like track such that the handle or member can be rotated around the ball.

The ball member is supported on a first rod or roller member 30 which is mounted for rotation about a longitudinal axis that is perpendicular to a first axis along which motion is to be encoded. The ball is further supported by a second roller or rod 32 which is rotatable about its longitudinal axis. In the preferred embodiment, the first and second rollers are perpendicular to each other such that the first and second encoding axes are likewise perpendicular. An additional roller bearing means 34, such as another rod or roller bearing, or a ball bearing is provided to provide stable, rotatable support for the ball member A. The ball member and the first and second rods interengage with sufficient friction that rotation of the ball causes corresponding rotation of the rod members.

The sensing means C includes a first rotational sensor assembly 40 for sensing rotation about the first axis generally parallel to the longitudinal axis of the first rod. Various rotation to electrical signal transducers may be utilized as are conventional in the art. For example, the transducer may include a disc 42 having a plurality of apertures 44 therein mounted for rotation with the first rod. A light source, such as one or more light emitting diodes and a pair of light detectors, such as photodiodes, create a pair of pulse trains whose frequency varies with the speed of rotation. By positioning the photodiodes such that the light paths are displaced circumferentially around the disc by a different spacing than the apertures 44, the relative phase of the pulse trains indicates the direction of rotation.

A second motion sensing means 50 includes an electromechanical transducer which converts rotation of the ball and second rod into corresponding electrical signals. In the preferred embodiment, the second motion sensing means 50 has the same construction as the first motion sensing means 40. Rather than a light and photodetector, other sensing arrangements may be provided. For example, a magnetic and reed switch arrangement, a cam and mechanical switch, an induction coil arrangement, or the like, may be utilized.

A third motion sensing means 60 converts movement of the ring 14 into corresponding electrical signals. In the illustrated embodiment, the third motion sensing means includes a track 62 on the ring member which engages a friction wheel 64. The wheel 64 drives a disc 66 having a plurality of apertures 68 therein. A light emitting diode/photodetector arrangement 70 or the like generates the electrical signal in response to rotation of the disc 66. The relative diameters of the track 62 on the ring member, the gear 64, and the apertures 68 is selected to achieve an appropriate frequency for the output signal. In the preferred embodiment, the third transducer 70 produces an output signal with substantially the same frequency or count rate for the same rate of rotation. Other motion sensing means may also be used to detect ring rotation. For example, a flange on the ring may interact directly with a photodiode/photodetector assembly, a magnet/reed switch assembly, or mechanical switch assembly, or the like.

The resolving circuitry D includes an up/down counter 72, 74, 76 connected to each of the transducers. Rotation of the encoding disk in one direction increments the count; and rotation in the other direction decrements the count. A resolver or position controller 78 converts the counts into indications of relative position or movement. For example, the resolver 78 may alter a video signal to shift, enlarge, rotate, etc. the portion displayed on a video monitor. Alternately, the resolver may control a means for reading data from an image memory to adjust which pixel values are displayed such that the displayed image is shifted, rotated, enlarged, or the like. Analogously, the resolver may provide the signal to control the position of a superimposed image or image segment, such as a cursor, marker, character, rectangle periphery, or the like.

Optionally, additional axes can be monitored to provide control of other dimensions or variables. For example, a three rather than two axis ball assembly may be provided. An additional roller and transducer assembly is mounted with its roller perpendicular to the first and second rollers and biased in firm frictional contact with the ball. In this manner, three axes or degrees of motion can be encoded with the ball and a fourth degree of motion encoded with the ring. Further, additional rings or members can be provided, e.g. concentric with the first ring to provide yet further controllable parameters.

In the embodiment of FIG. 2, the housing 20 supports a first ring member 80 closely surrounding the ball member A. In the illustrated embodiment, the first or inner ring member is generally a vertical cylinder. A second ring member 82 in the form of a truncated cone, surrounds the first ring member. A third ring member 84 in the form of a handle or manual graspable portion which moves in a peripheral slot or groove in the housing 20 provides for yet another degree of motion encoding. With a three axis roller ball, six degrees of freedom can be encoded. A key board 86 enables additional information to be encoded, for commands to be entered changing the axis controlled by each ring or the ball member, and the like. Other control buttons 88 for direction, or the like, may also be mounted in the housing. A socket 90 facilitates interconnection with other associated equipment.

The invention has been described with reference to the preferred embodiments. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A multi-axis electromechanical indicator apparatus comprising:
   a rotatably mounted ball;
   a first motion sensor means for sensing rotation of the ball relative to a first axis;
   a second motion sensor means for sensing rotation of the ball relative to a second axis;
   a first peripheral member mounted adjacent a periphery of the ball for movement therearound;
   a third motion sensing means for sensing rotation of the first peripheral member relative to the ball;
   a second peripheral member mounted for movement around the periphery of the ball; and
   a fourth motion sensing means for sensing rotation of the second peripheral member relative to the ball.

2. The apparatus as set forth in claim 1 further including a resolver means for converting the sensed motion of the ball and peripheral members into an indication of movement relative to at least three axes.

3. The apparatus as set forth in claim 1 wherein at least one of the peripheral members is a ring member that extends circumferentially around the periphery of the ball.

4. The apparatus as set forth in claim 3 wherein the ring member has an angled upper surface.

5. The apparatus as set forth in claim 4 wherein the ring member upper surface is generally tangential to the ball.

6. The apparatus as set forth in claim 3 wherein the ring member has a textured surface to facilitate manual grasping.

7. A method of encoding information, the method comprising:
   rotating a ball;
   sensing rotation of the ball relative to a first axis;
   sensing rotation of the ball relative to a second axis;
   rotating a first member around a periphery of the ball;
   sensing rotation of the first member about the periphery of the ball;
   rotating a second member around the periphery of the ball; and sensing the rotation of the second member about the ball.

8. The method as set forth in claim 7 further including converting the sensed rotation of the ball about the first axis into a first signal, converting the sensed rotation of the ball relative to the sensed axis into a second signal, and converting the sensed rotation of the first and second members into third and fourth signals.

9. The method as set forth in claim 8 further including converting the first, second, third, and fourth signals into an indication of movement or position relative to at least three axes.

10. The method as set forth in claim 7 further including sensing rotation of the ball relative to a third axis.

11. A multi-axis indicator for indicating movement relative to three mutually perpendicular axes, the indicator comprising:
    a rotatably mounted ball;
    a peripheral member mounted adjacent a periphery of the ball for rotational movement around the ball;
    a first motion sensor means for sensing rotation of the ball relative to a first axis;
    a first electromechanical transducer for converting the sensed rotation of the ball relative to the first axis into a first electrical signal;
    a second motion sensor means for sensing rotation of the ball relative to a second axis;
    a second electromechanical transducer for converting the sensed rotation of the ball relative to the second axis into a second electrical signal;
    a third motion sensor means for sensing rotation of the peripheral member around the periphery of the ball;
    a third electromechanical transducer for converting the sensed rotation of the peripheral member relative to the periphery of the ball into a third electrical signal;
    a resolver for converting the first signal into an indication of distance along the first axis, for converting the second electrical signal into an indication of distance along the second axis, and for converting the third electrical signal into an indication of angular rotation around the third axis proportional to the rotation of the peripheral member around the ball.

12. A method for encoding displacement and rotation relative to three axes, the method comprising:
    sensing rotation of a ball relative to first and second axes;
    converting the sensed rotation into an indication of displacement of an image along the first axis and an indication of displacement of an image along the second axis;
    sensing movement of a member around a periphery of the ball;
    converting the sensed movement into an indication of rotation around a third axis.

* * * * *